United States Patent
Viereck et al.

(10) Patent No.: US 7,468,091 B2
(45) Date of Patent: Dec. 23, 2008

(54) METHOD FOR DEHUMIDIFYING AIR AND AIR DEHUMIDIFIER FOR OIL-INSULATED TRANSFORMERS, REACTANCE COILS AND STEP SWITCHES

(75) Inventors: Karsten Viereck, Regenstauf (DE); Dieter Dohnal, Lappersdorf (DE); Ansgar Hinz, Leverkusen (DE); Reiner Brill, Nidda (DE)

(73) Assignee: Maschinefabrik Reinhausen GmbH, Regensburg (DE)

( * ) Notice: Subject to any disclaimer, the term of this patent is extended or adjusted under 35 U.S.C. 154(b) by 430 days.

(21) Appl. No.: 10/576,157

(22) PCT Filed: Dec. 3, 2004

(86) PCT No.: PCT/EP2004/013774

§ 371 (c)(1),
(2), (4) Date: Apr. 17, 2006

(87) PCT Pub. No.: WO2005/055255

PCT Pub. Date: Jun. 16, 2005

(65) Prior Publication Data

US 2007/0199443 A1 Aug. 30, 2007

(30) Foreign Application Priority Data

Dec. 6, 2003 (DE) .................... 103 57 085

(51) Int. Cl.
*H01F 27/14* (2006.01)
*B01D 53/26* (2006.01)

(52) U.S. Cl. .................... 95/10; 95/11; 95/21; 95/126; 96/111; 96/113; 336/58; 174/14 R

(58) Field of Classification Search .................... 95/10, 95/11, 19, 21, 117, 121, 126; 96/111, 113, 96/110, 143; 336/58; 174/15.1, 14 R; 73/29.01, 73/31.04
See application file for complete search history.

(56) References Cited

U.S. PATENT DOCUMENTS

| 1,476,138 | A | * | 12/1923 | Bingay ................ 174/14 R |
| 1,601,308 | A | * | 9/1926 | Hill .................... 96/117.5 |
| 1,759,971 | A | * | 5/1930 | Austin ................. 174/12 R |
| 5,902,381 | A | | 5/1999 | Golner et al. |
| 6,800,114 | B2 | * | 10/2004 | Vanderhoof et al. ........... 95/117 |
| 7,332,015 | B2 | * | 2/2008 | Golner et al. .................. 95/10 |
| 2003/0089238 | A1 | | 5/2003 | Viereck et al. |

FOREIGN PATENT DOCUMENTS

JP 60198710 10/1985

* cited by examiner

*Primary Examiner*—Frank M Lawrence
(74) *Attorney, Agent, or Firm*—Andrew Wilford

(57) ABSTRACT

The invention relates to a method for dehumidifying air and to an air dehumidifier. To this end, a filter element is provided that is filled with granular material that can be regenerated by baking out. For effecting this baking out, a heating device is provided that is only actuated when both a humidity sensor indicates that a humidity limit value has been exceeded as well as a relative pressure sensor or a comparable technical means indicates that, at the moment, no flow toward the oil expansion tank is recorded.

4 Claims, 4 Drawing Sheets

Figure 1:
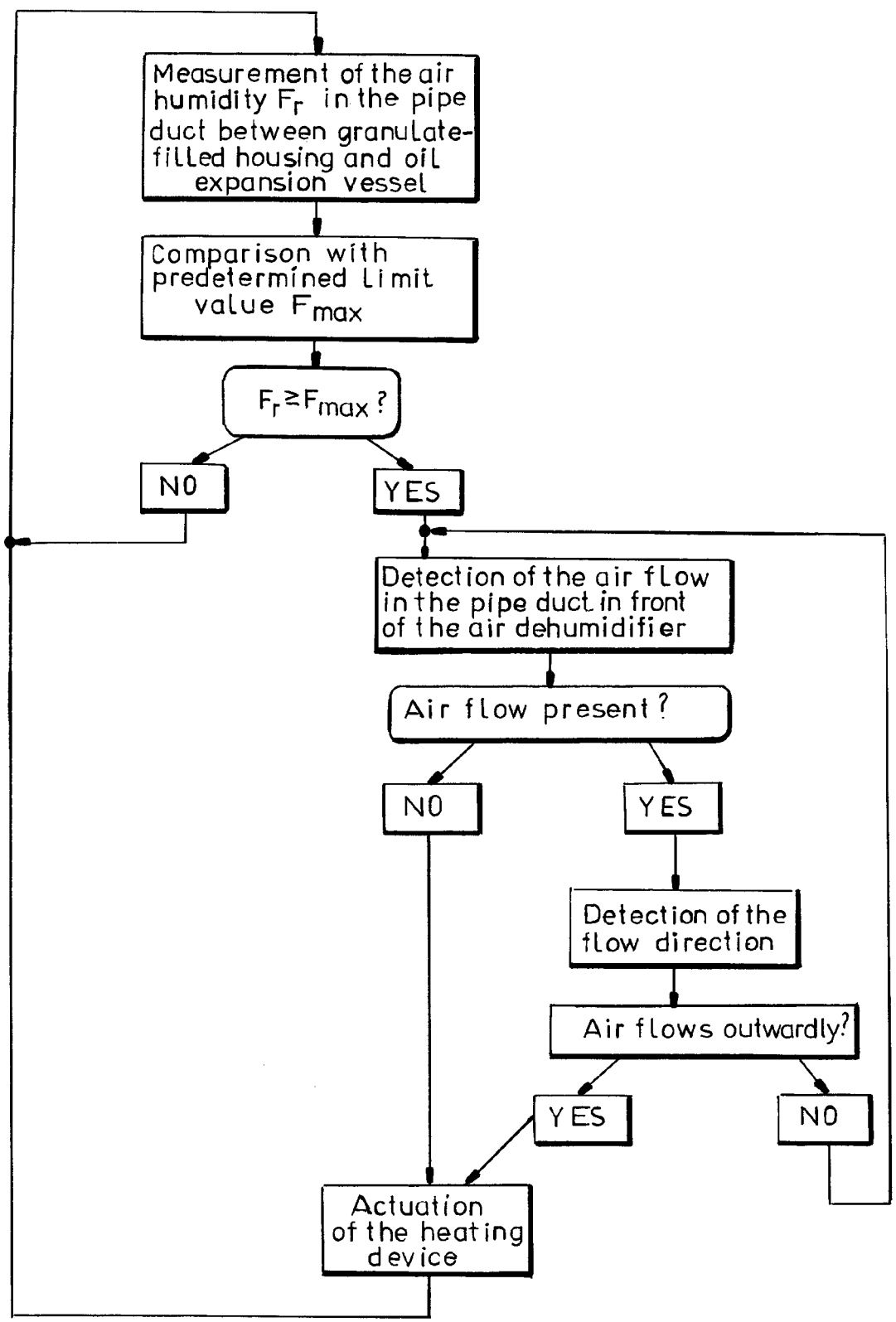

METHOD FOR DEHUMIDIFYING AIR AND AIR DEHUMIDIFIER FOR OIL-INSULATED TRANSFORMERS, REACTANCE COILS AND STEP SWITCHES

CROSS REFERENCE TO RELATED APPLICATIONS

This application is the US national phase of PCT application PCT/EP2004/013774 filed 3 Dec. 2004 with a claim to the priority of German patent application 10357085.3 itself filed 6 Dec. 2003.

The invention relates to a method for air dehumidification for oil-insulated transformers, reactance coils and step switches, for dehumidification of the air inducted into oil expansion vessels. The invention additionally relates to an air dehumidifier suitable therefor.

An oil expansion vessel is usually provided for oil-filled transformers, reactance coils or step switches in order to compensate for the changes in volume of the insulating oil caused by temperature changes. In order that the inducted air does not have an unacceptable moisture content, it is dried by means of an air dehumidifier. Such an air dehumidifier is known from EP 1 313 112 A1.

This known air dehumidifier comprises a housing in which a moisture-absorbing absorption medium or granulate, which is flowed through by the inducted air, is arranged. The granulate is regeneratable, i.e. by heating in the saturated state it is repeatably restorable to the moisture-accepting state. A heating device in the housing serves for baking the granulate, the heating device being controlled in drive by a moisture sensor which is arranged above the housing so that the air already led through the granulate flows around it. If the moisture sensor signals an impermissible moisture content of the inducted air and thus saturation of the granulate the heating device is actuated, the granulate baked and the granulate is thus restored again to the moisture-accepting state. In addition, a magnetic valve is located between the housing with the moisture-absorbing granulate and an oil reserve arranged thereabove. This magnetic valve is closed during the described baking; after the heating device has been switched off, the valve is opened again.

It is disadvantageous with this known solution that the described magnetic valve obstructs, due to the fact that it is closed, the air exchange between the air space of the oil expansion vessel on the one hand and the ambient air on the other hand during the heating. As a result, during this time of baking an excess pressure or also an underpressure can build up in the oil expansion vessel and lead to excessive throughflowing of the air dehumidifier after opening the magnetic valve. This increased throughflow, i.e. the increased air throughput, can bring into question whether there is sufficient dehumidification of the throughflowing air. However, in every case it is necessary to prevent moist air entering the oil expansion vessel.

It is accordingly the object of the invention to indicate a method which avoids with certainty this undesired entry of insufficiently dehumidified air into the oil expansion vessel. Moreover, it is an object of the invention to indicate a corresponding air dehumidifier which ensures this.

This object is fulfilled by a method with the features of claim 1 or a method with the features of the parallel claim 2 and an air dehumidifier with the features of claim 3. Subclaim 4 relates to a particularly advantageous development of the air dehumidifier according to the invention.

The general inventive concept basic to both the method for air dehumidification and the air dehumidifier is to omit the magnetic valve according to state of the art and instead thereof to detect the presence of an air flow in the air dehumidifier and optionally the flow direction thereof and in the case of a signal, which is delivered by a humidity sensor according to the state of the art, for baking to actually allow actuation of the heating device only if either no air flow is present or if the air is escaping from the oil expansion vessel, but in no case during induction of air into the oil expansion vessel. Commercially available air flow sensors are usable for detection of a flow and, in a given case, the flow direction.

Moreover, there is the possibility of determining the described flow and direction thereof indirectly by a relative pressure measurement. In that case the pressure in front of the air dehumidifier, i.e. in the pipe duct to the oil expansion vessel, is compared with the pressure of the ambient air. This is possible, since the granulate filling in the housing of the air dehumidifier represents a defined flow resistance for the air in both directions. Again, relative pressure sensors are commercially available for such a measurement. Such a relative pressure sensor is known from the company publication '401: OEM Druck-Vakuum-, Differenzdruck-Transmitter 0-3/0-5 mbar' of the company Huba Control. A further variant of the sensor, which issues a switching signal depending on the respective flow direction, i.e. the sign of the relative pressure, is known from the further company publication '604: Differenz-, Vakuum-, Überdruck-Wächter 0.2-50 mbar' of the same company.

Figure 2:
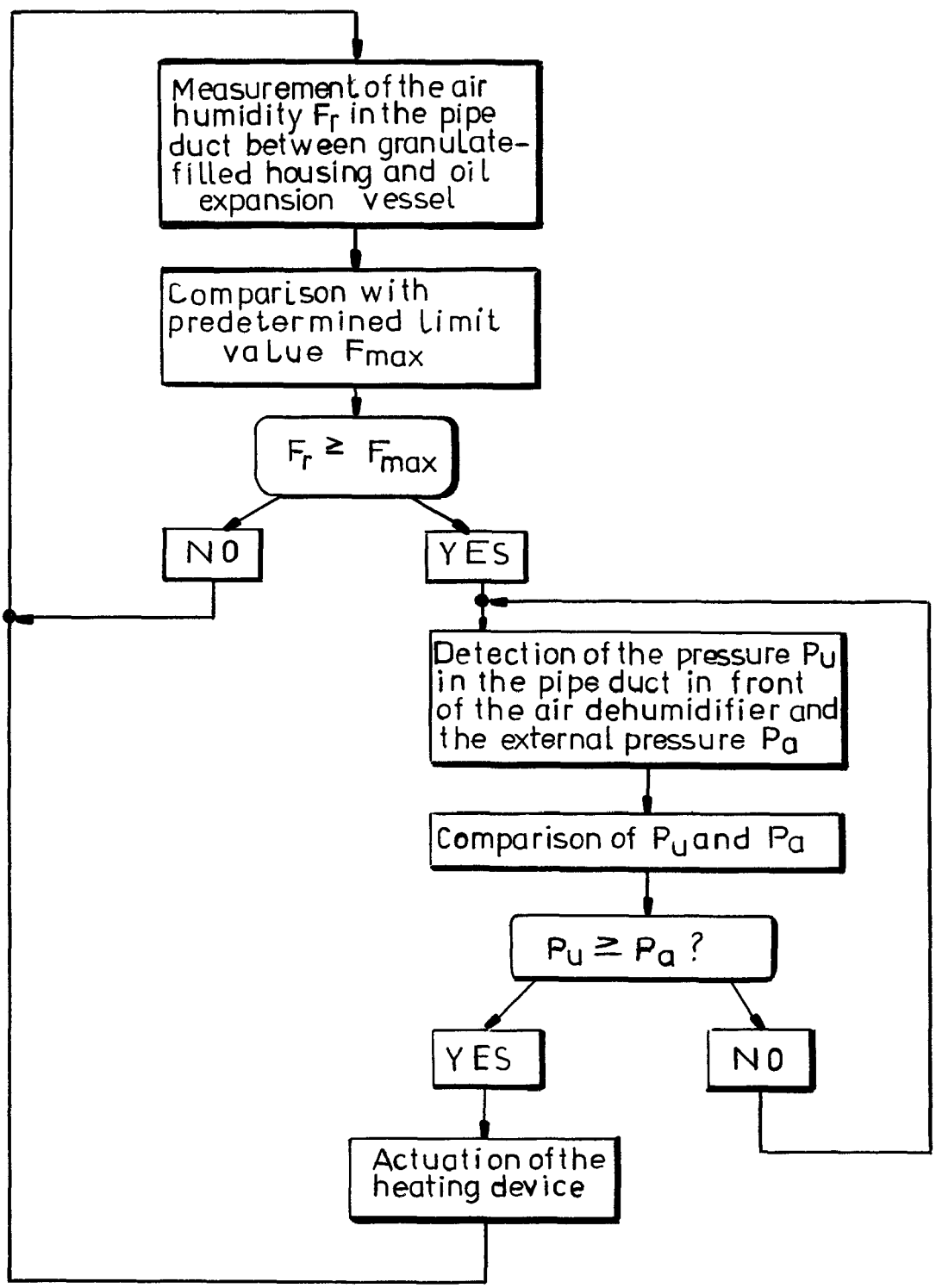
Figure 3:
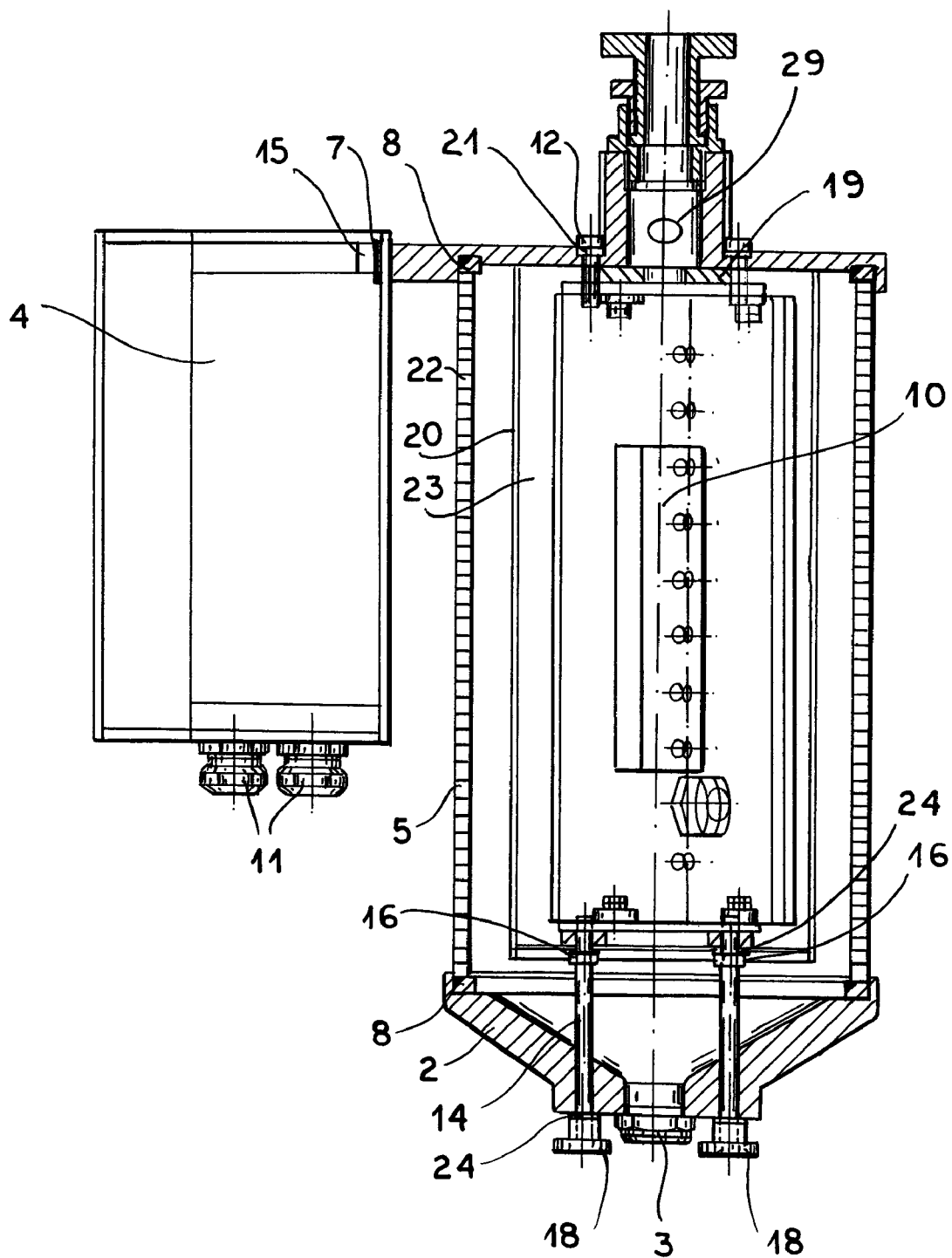
Figure 4:
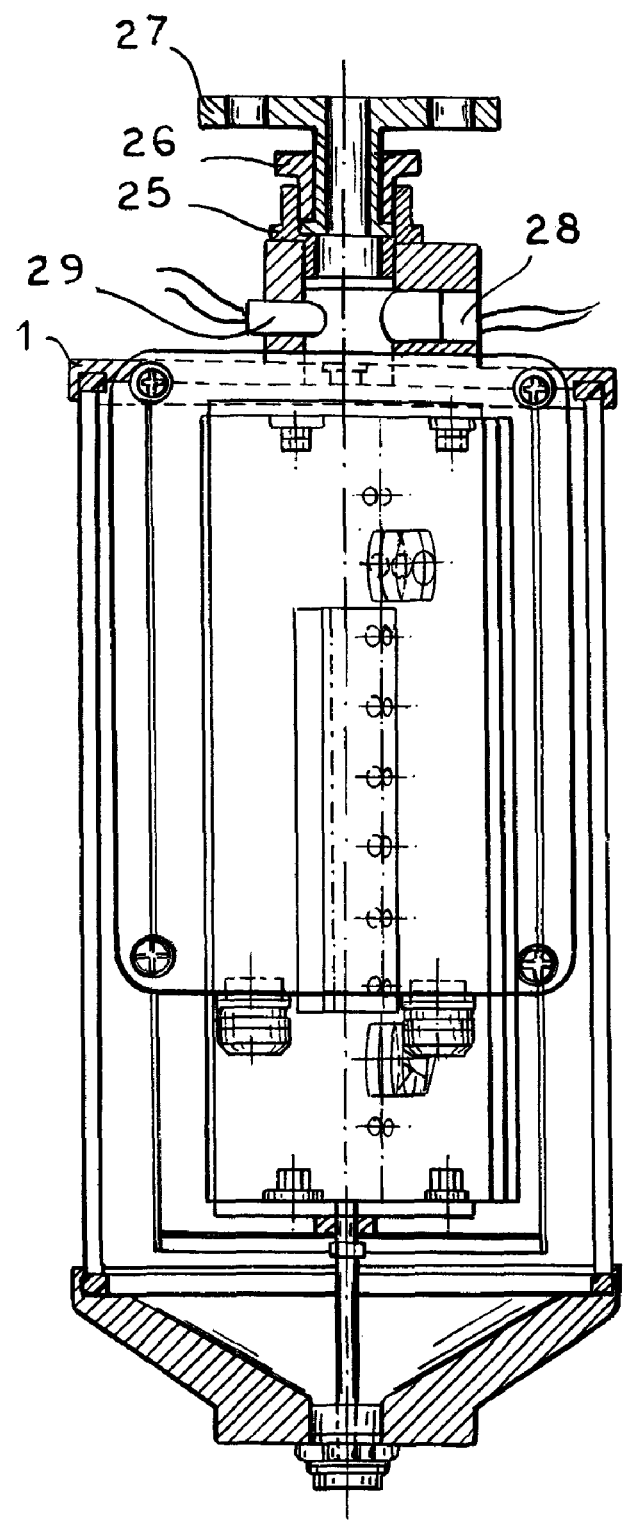

The invention shall be explained in more detail by way of example with reference to drawings, in which:

FIG. 1 shows the schematic flow chart of a first method according to the invention, FIG. 2 shows the schematic flow chart of a second method according to the invention, FIG. 3 shows a schematic view of an air dehumidifier according to the invention and FIG. 4 shows a further schematic view, which is turned horizontally through 90 degrees, of this air dehumidifier.

Initially the first method illustrated in FIG. 1 shall be explained in more detail.

The air humidity $F_r$ is measured by a moisture sensor, which is known from the state of the art and disposed physically between the granulate-filled housing of the air dehumidifier and the oil expansion vessel, and is subsequently compared with a predetermined limit value $F_{max}$. If this limit value is attained or exceeded, according to the state of the art the magnetic valve was closed, the heating device controlled in drive and the granulate baked. In the case of the method according to the invention, thereagainst, it is additionally checked in such a case whether an air flow is present in the air dehumidifier and, if so, in which direction this runs. Only if an air flow is not present or if an air flow which is present is directed outwardly, i.e. into the free atmosphere, is the heating device actuated. The information of the (known) humidity sensor for actuation of the heating device is thus linked with further information about the air flow.

A further method according to the invention is schematically illustrated in FIG. 2, in which, if it is established as a result of a comparison of the measured air humidity $F_r$ with the limit value $F_{max}$ this limit value is reached or exceeded, a comparison of the pressure $P_u$ in the pipe duct in front of the air dehumidifier with the external pressure $P_a$ is additionally undertaken. Only if, in addition to the excessive air humidity, the pressure $P_u$ is greater than or equal to the external pressure $P_a$ does actuation of the heating device take place and the granulate is baked and restored again to the moisture-accepting state.

It is obviously also possible within the scope of the invention to interchange the sequence of detection of information about the air humidity on the one hand and the flow direction or relative pressure on the other hand relative to the illustration in the figures or to undertake the comparisons in parallel. It is only important that the heating device is switched on when and only when both the relevant information about exceeding of the humidity limit value and additionally the information about absence of an air flow or an air flow directed outwardly from the oil expansion vessel are present.

An air dehumidifier according to the invention is illustrated in FIGS. 3 and 4 and described in more detail in the following.

The air dehumidifier according to the invention has an upper flange 1 and a lower closure cap 2; a housing 5 is disposed therebetween, a cylinder of Duran glass being particularly suitable for that purpose. The lower closure cap 2 is made, with particular advantage, from metal or another material with good specific thermal conductivity and has an internal contour of funnel-shaped form. A defined, locally limited condensation of the baked liquid is achieved by this construction of the lower closure cap 2 with good specific thermal conductivity. This is particularly so because the cylinder 5 of Duran glass has a significantly poorer thermal conductivity. A filter 3 of sintered bronze with a brass foot, through which the condensed liquid can issue downwardly, is provided in the middle at the deepest point of the lower closure cap 2. A switch housing 4 is arranged laterally. This switch housing 4 is fixed by means of spring ring 7 and cylinder screw 15. The housing 5 is sealed by lower and upper sealing rings 8 relative to the flange 1 as well as the lower housing cap 2. A granulate housing 20, which is filled with granulate 23 and has a heater 10 in the interior, is disposed within the housing 5. Cable screw connections 11 are located at the underside of the switch housing 4. A screw connection by means of cylinder screw 12 with a spacer washer 21 is provided at the top in the flange 1; from below, the granulate housing 20 with the heater 10 is held by spindles 14 led perpendicularly through the lower closure cap 2. Fixing in the horizontal position is effected by means of nuts 16; respective lock washers 24 are, in addition, inserted. The lower fastening of the closure cap 2 is effected by knurled nuts 18 tightened on the spindles 14. In addition, an insulating ring 19 is provided in the upper region, below the flange 1. The reference numeral 22 denotes a sleeve plug, shown only schematically. Disposed at the top, outside the housing 5, is a double screw connection 25 which co-operates with a screw connection of the flange 1, wherein in turn a screwed-in screw connection 26, together with a connecting flange 27 fastened by that, is provided therein, the flange in turn producing the connection—not illustrated here—with the oil expansion vessel. A humidity sensor 28 known from the state of the art and additionally a relative pressure sensor 29 according to the invention are screw-fitted in the upper region of the flange 1 to respectively extend into the hollow interior. The electrical connecting lines are indicated only schematically. The humidity sensor 28 detects, as known from the state of the art, the moisture state of the air flowing around it. If the detected humidity value exceeds a predetermined limit value this means that the granulate 23 in the interior of the granulate housing 20 is at least substantially saturated, no longer takes up further moisture and has to be dried out. The relative pressure sensor 29 additionally arranged in accordance with the invention supplies additional information about whether or not the pressure $P_u$ in the interior of the air dehumidifier is greater than or equal to the external pressure $P_a$. If this is the case, then the additionally necessary condition for switching-on the heater 10 is fulfilled and the granulate 23 is baked. By virtue of the co-operation of humidity sensor 28 and relative pressure sensor 29 it is thus ensured that the heater 10 is switched on only when the humidity sensor 28 signals that a moisture limit value has been exceeded and in addition the relative pressure sensor 29 signals that in the air dehumidifier either no air flow is present—this is the case if $P_u$ is equal to $P_a$—or if an air flow directed outwardly from the oil expansion vessel is present, this being the case if $P_u$ is greater than $P_a$. If this additional condition, detected by the relative pressure sensor 29, is not fulfilled, there is in general no baking, however high the moisture of the air in the interior may be. Through this construction of the air dehumidifier in accordance with the invention it is accordingly possible in elegant manner to save the magnetic valve required according to the state of the art, whereby the disadvantages stated in the introduction are eliminated and beyond that both costs and space are saved. It may be noted that in the case of the description of the air dehumidifier according to the invention and in the associated drawings neither the electrical connecting lines to the switch housing 4 nor the electrical switching means in the interior thereof have been illustrated and explained, because they are known from the state of the art or familiar to the expert. Moreover, it is obviously also possible within the scope of the invention to provide both the humidity sensor 28 and the relative pressure sensor 29 at different locations in the air dehumidifier. It is only important that these two subassemblies are located at a point flowed through by the air towards the oil expansion vessel after the air has passed through the granulate housing 20.

The invention claimed is:

1. Method of air dehumidification for oil-filled transformers, reactance coils and step switches for dehumidification of the air inducted into an oil expansion vessel, wherein the air humidity $F_r$ is measured in the area between a granulate-filled housing of an air dehumidifier and the oil expansion vessel connected therewith, and wherein subsequently a comparison of the measured air humidity $F_r$ with a predetermined limit value $F_{max}$ is undertaken and if the limit value is exceeded an electric heating device for baking the moisture-absorbing granulate in the interior of the housing is activated, characterised in that it is additionally detected whether an air flow is present between the housing (5) and the oil expansion vessel and if so which flow direction this air flow has and that the electric heating device is switched on only if either no air flow is present or this is directed outwardly from the oil expansion vessel.

2. Method of air dehumidification for oil-filled transformers, reactance coils and step switches for dehumidification of the air inducted into an oil expansion vessel, wherein the air humidity $F_r$ is measured in the area between a granulate-filled housing of an air dehumidifier and the oil expansion vessel connected therewith, and wherein subsequently a comparison of the measured air humidity $F_r$ with a predetermined limit value $F_{max}$ is undertaken and if the limit value is exceeded an electric heating device for baking the moisture-absorbing granulate in the interior of the housing is activated, characterised in that in addition the pressure $P_u$ between the housing (5) and the oil expansion vessel is detected and compared with the external pressure $P_a$ and that the electric heating device is switched on only if $P_u$ is greater than or equal to $P_a$.

3. Air dehumidifier for oil-filled transformers, reactance coils and step switches for dehumidification of the air inducted into an oil expansion vessel, consisting of an upper flange, a lower closure cap and a housing disposed therebetween, wherein a moisture-absorbing granulate which is flowed through by the inducted air is arranged in the housing in a separate permeable granulate housing, wherein the granulate is a regeneratable medium which through heating in the saturated state is repeatably restorable to the moisture-accepting state, wherein the granulate housing has an electric heating device, wherein in addition a humidity sensor is provided which is arranged in such a manner that the inducted air already led through the housing flows around the sensor and wherein the humidity sensor controls the heating device, characterised in that in addition a relative pressure sensor (29) is provided at the air dehumidifier in such a manner that the inducted air already led through the housing (5) on its path to the oil expansion vessel flows around the relative pressure sensor, that a pressure difference between the pressure $P_u$ in the interior of the air dehumidifier and the pressure $P_a$ outside the air dehumidifier is ascertainable by the relative pressure sensor (29) and that the heating device can be switched on only if $P_u$ is greater than or equal to $P_a$.

4. Air dehumidifier according to claim 3, characterised in that the housing (5) consists of a material with a poor thermal conductivity, preferably glass, that the lower closure cap (2) consists of metal or another material with a good specific thermal conductivity and that the internal contour of the closure cap (2) is formed to be funnel-shaped.

* * * * *